United States Patent [19]

Brown

[11] Patent Number: 4,881,317

[45] Date of Patent: Nov. 21, 1989

[54] TERMINAL INSERTING APPARATUS

[76] Inventor: Maurice H. Brown, 11700 S. Mayfield, Worth, Ill. 60482

[21] Appl. No.: 313,175

[22] Filed: Feb. 21, 1989

Related U.S. Application Data

[62] Division of Ser. No. 139,660, Dec. 30, 1987, Pat. No. 4,836,006.

[51] Int. Cl.$^4$ .............................................. H01R 43/00
[52] U.S. Cl. ...................................... 29/739; 29/747; 29/759
[58] Field of Search ................. 29/739, 747, 748, 759, 29/760, 837–839, 844, 845, 881

[56] References Cited

U.S. PATENT DOCUMENTS

| | | |
|---|---|---|
| Re. 30,927 | 5/1982 | Brown . |
| Re. 31,183 | 3/1983 | Brown . |
| 365,473 | 6/1887 | Hinsdale . |
| 524,742 | 8/1894 | Vaughan et al. . |
| 913,013 | 2/1909 | Jensen . |
| 1,309,354 | 7/1919 | Dallmeyer et al. . |
| 2,106,274 | 1/1938 | Frayer et al. . |
| 2,766,516 | 10/1956 | Chantler . |
| 3,485,079 | 12/1969 | Bogaert . |
| 3,714,708 | 2/1973 | Brown . |
| 3,945,237 | 3/1976 | Brignoli . |
| 3,958,732 | 5/1976 | Aoyama et al. . |
| 4,068,367 | 1/1978 | Brown . |
| 4,142,285 | 3/1979 | Brown . |
| 4,179,785 | 12/1979 | Brown . |

FOREIGN PATENT DOCUMENTS 100587 8/1979 Japan .

Primary Examiner—Carl E. Hall
Attorney, Agent, or Firm—Kinzer, Plyer, Dorn, McEachran & Jambor

[57] ABSTRACT

A method and apparatus for continuously forming pointed terminals from a length of wire. The length of wire is moved to a position where a portion of the wire is positioned between a pair of opposed swedges. The pair of swedges is closed to engage and deform the portion of wire. The wire is then moved to position the deformed portion of wire at a wire severing location and another portion of the wire is positioned between the pair of opposed swedges. The wire is twisted relative to the deformed portion to separate the portion of the wire ahead of the deformed portion to form a terminal. The pair of swedges are closed simultaneously with the twisting to deform the next portion of wire and these steps are repeated.

1 Claim, 8 Drawing Sheets

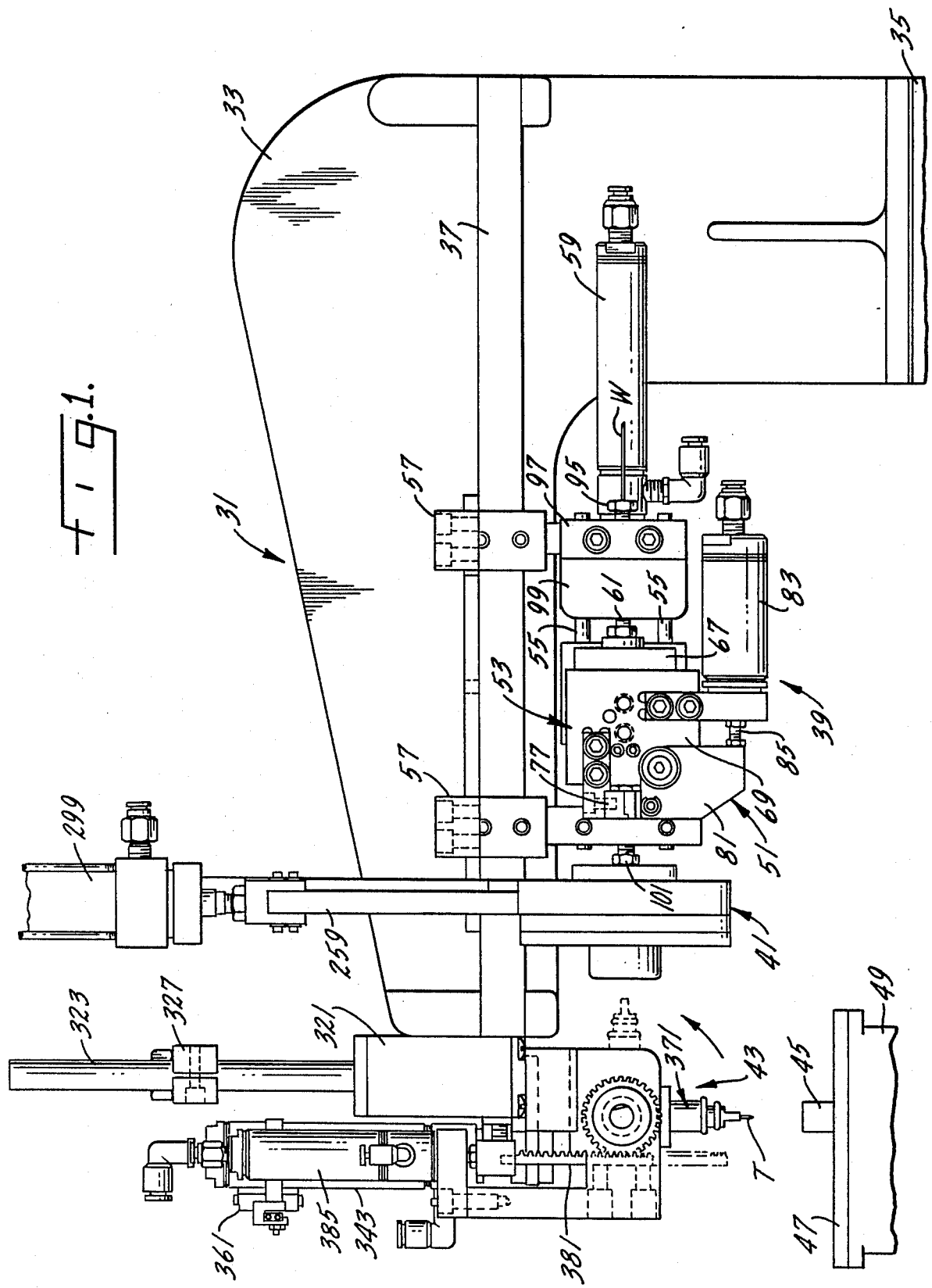

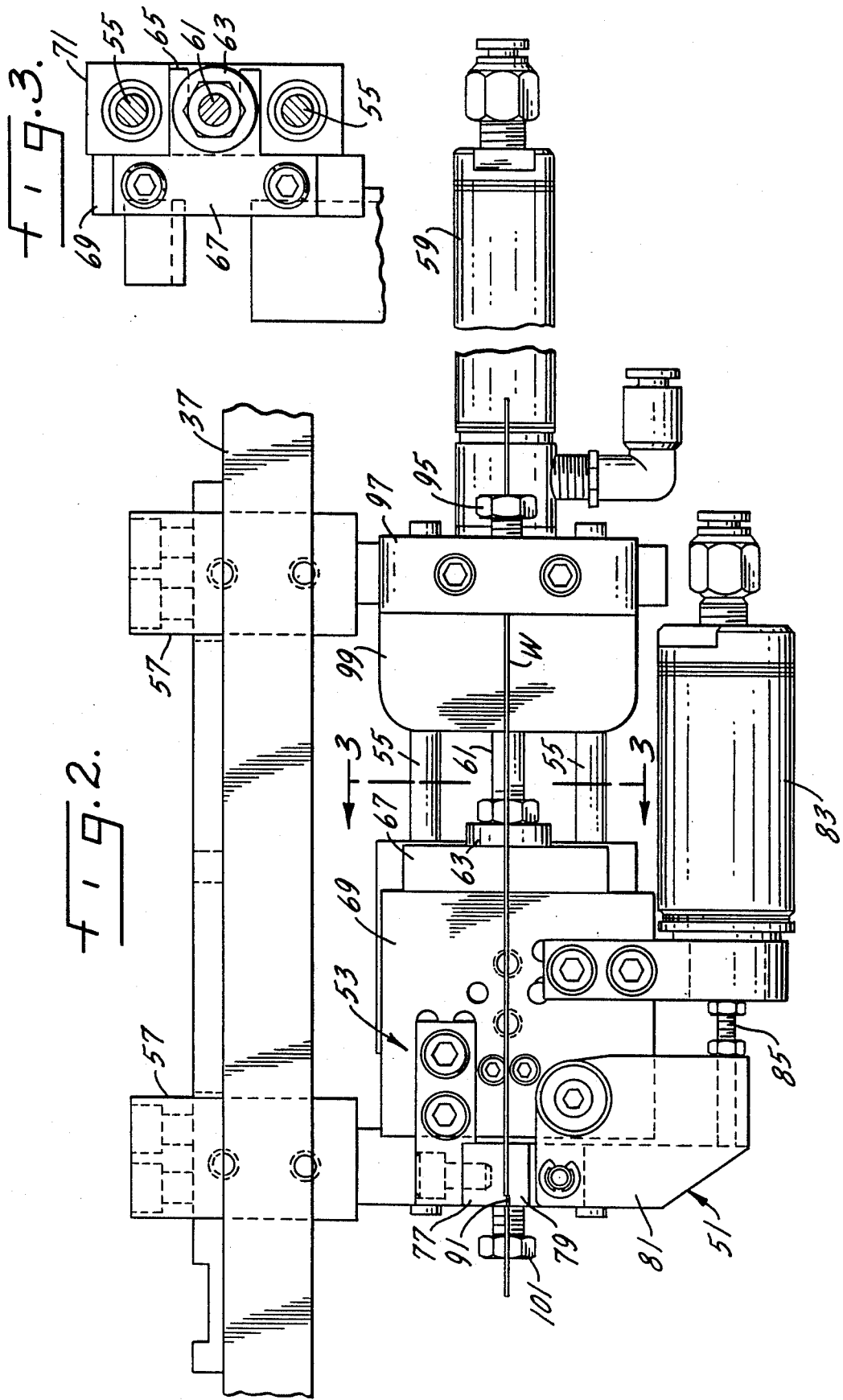

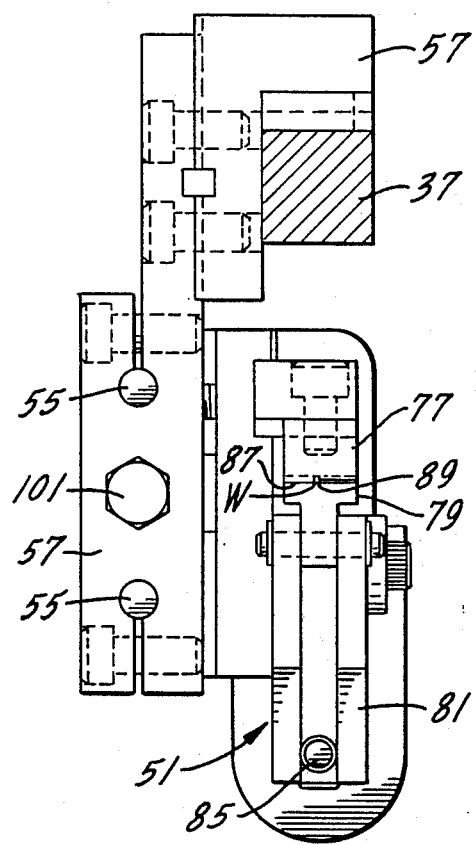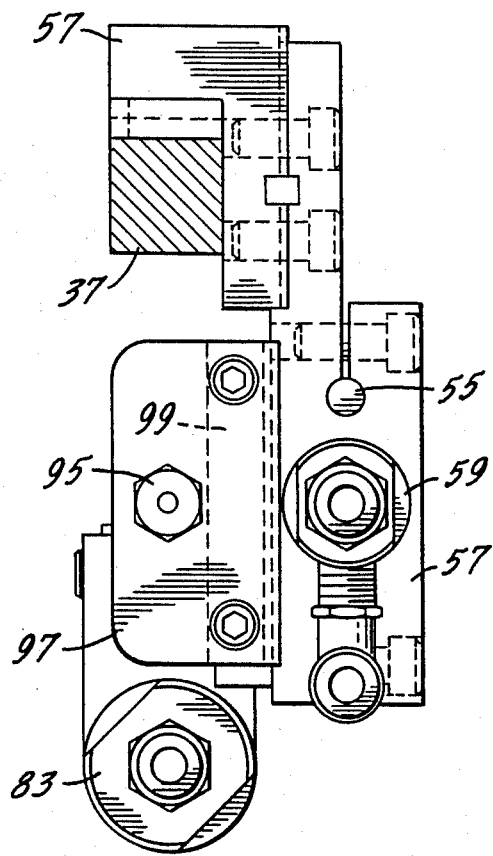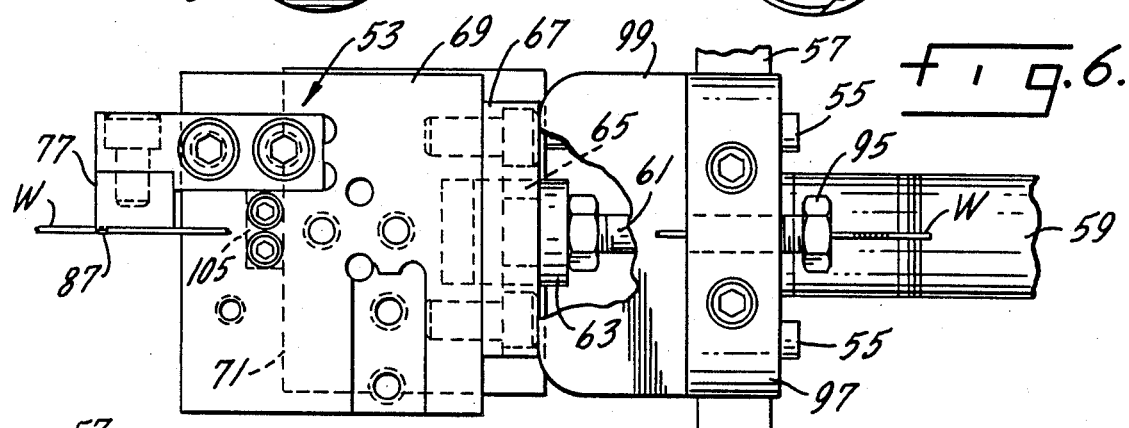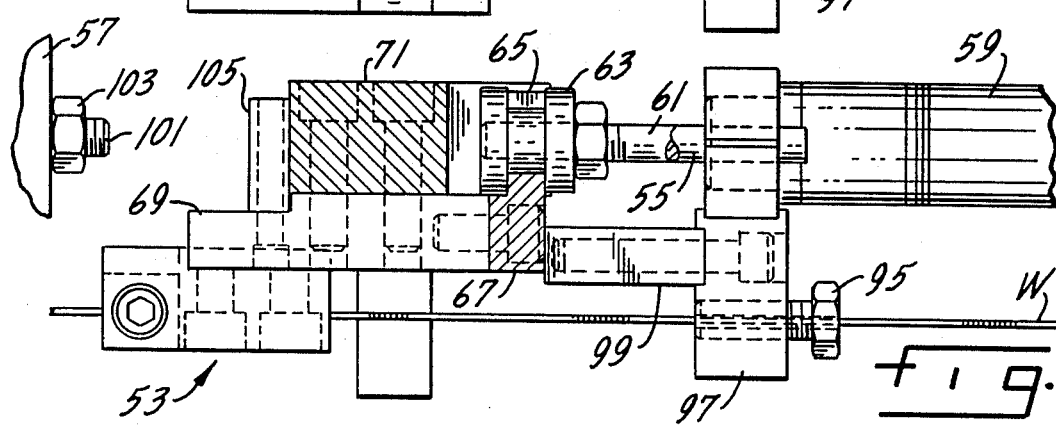

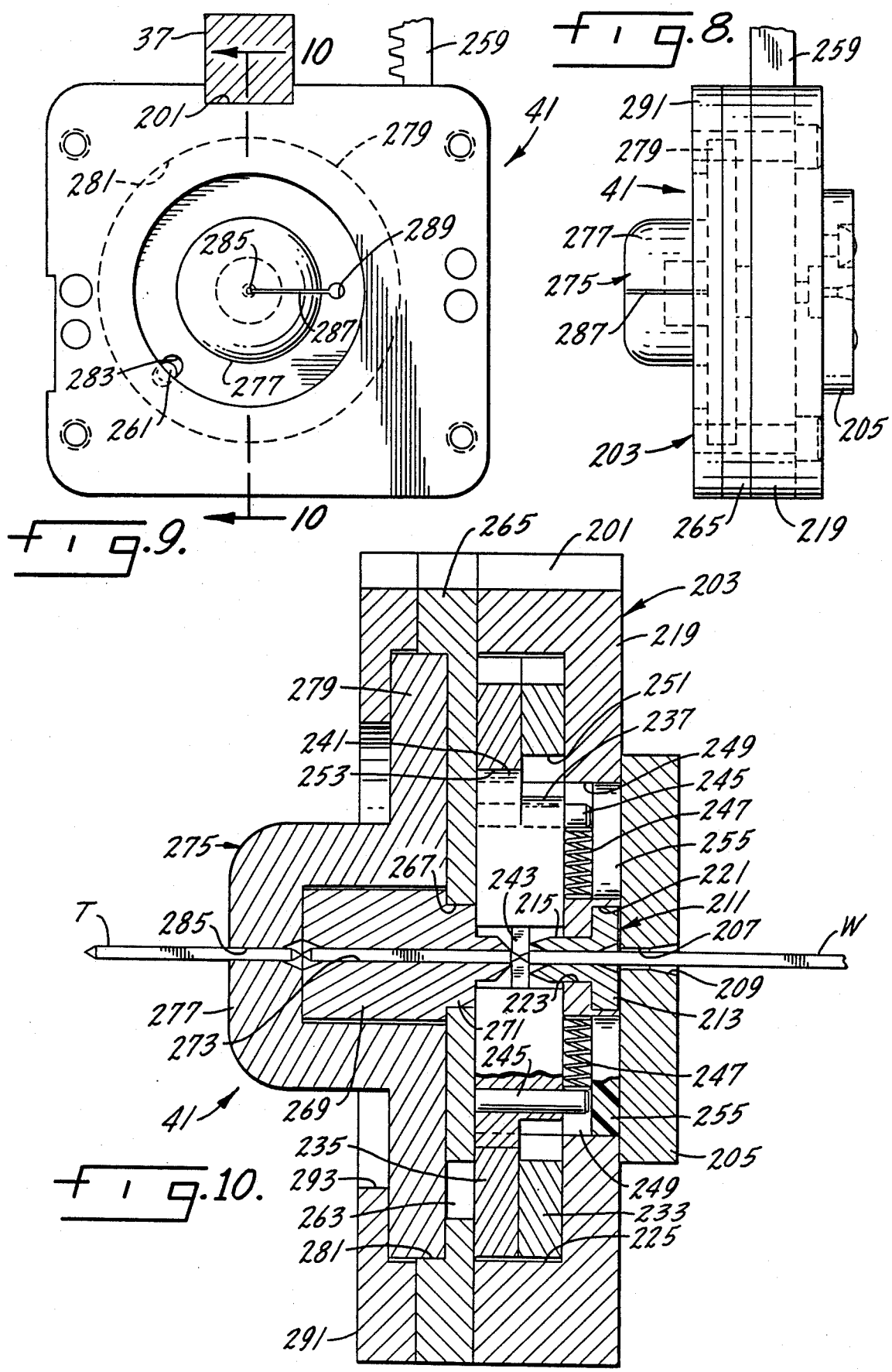

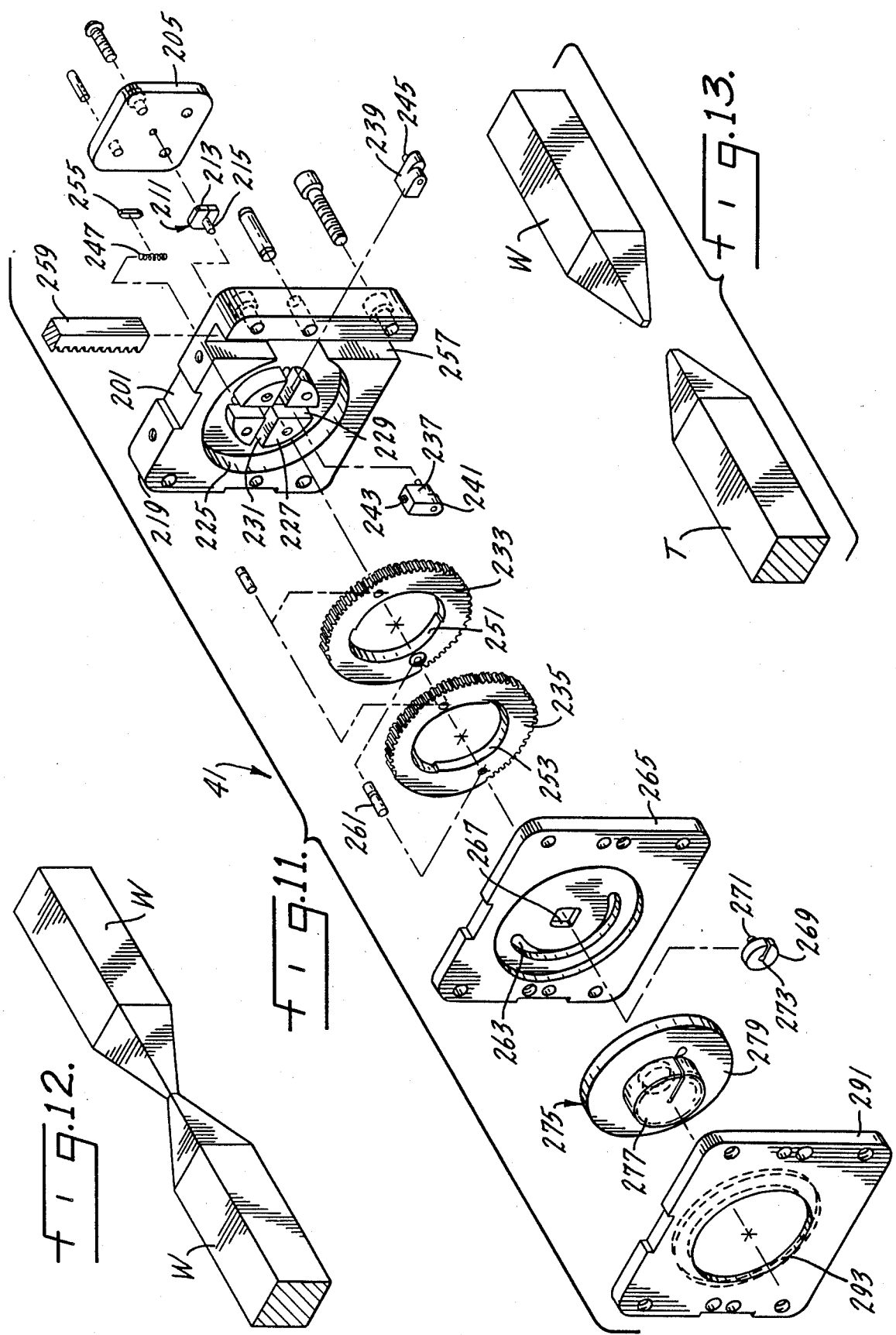

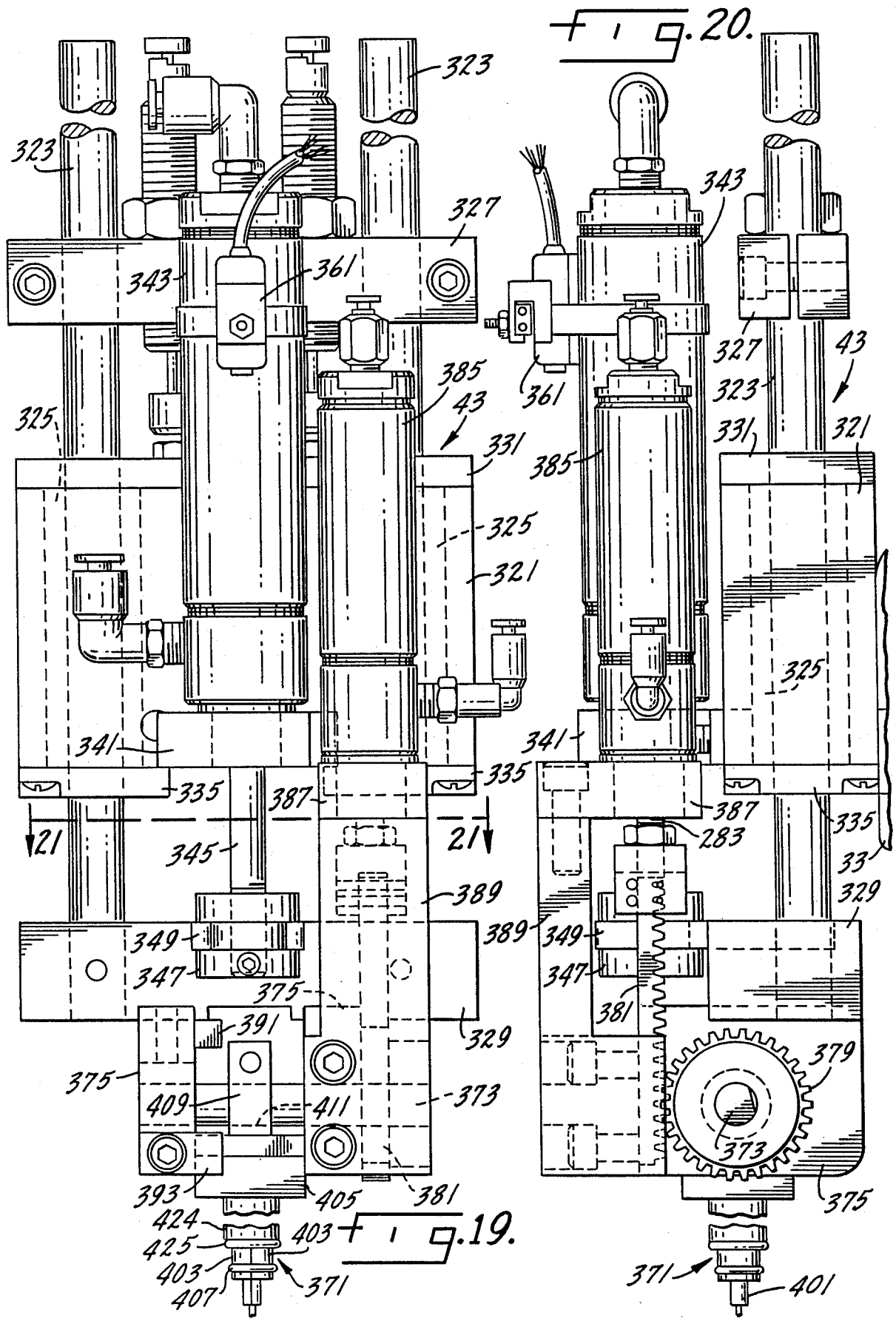

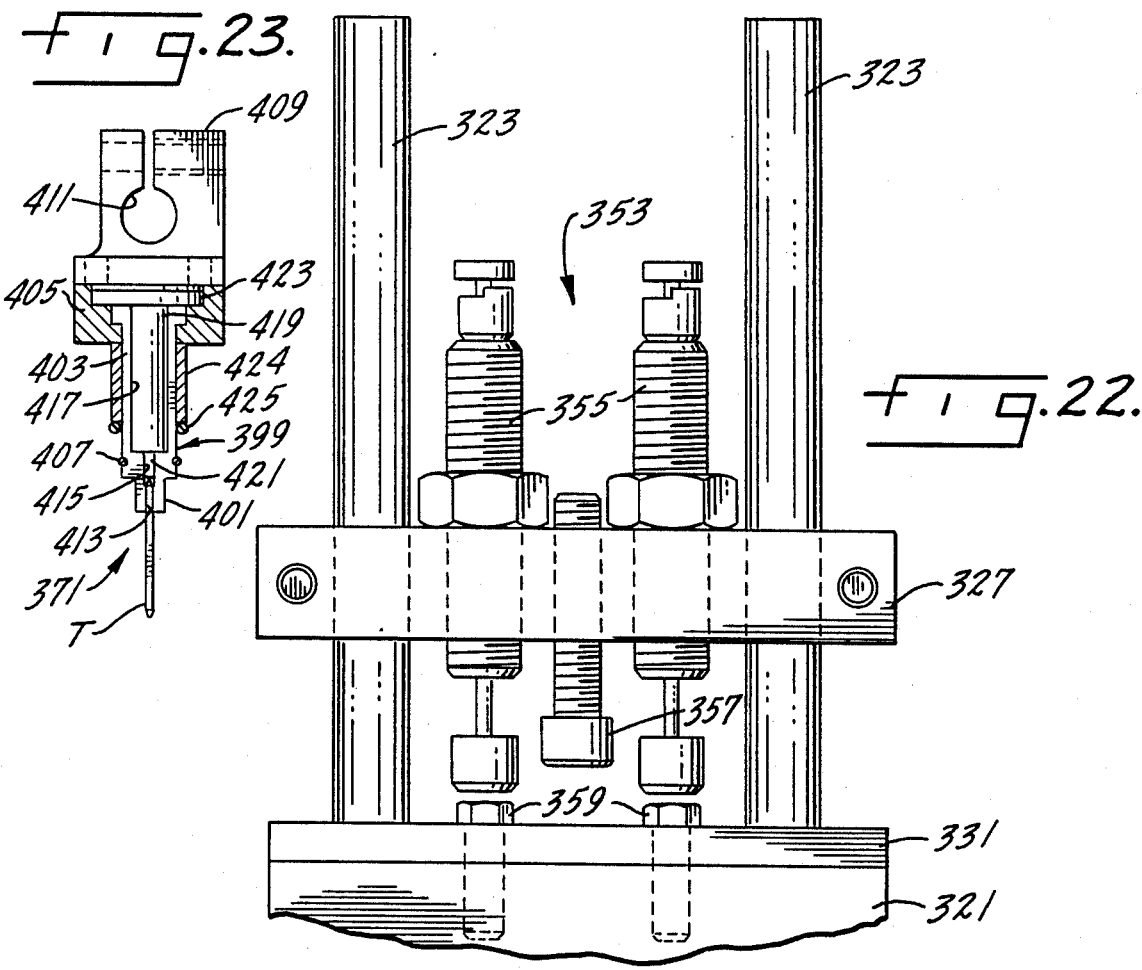
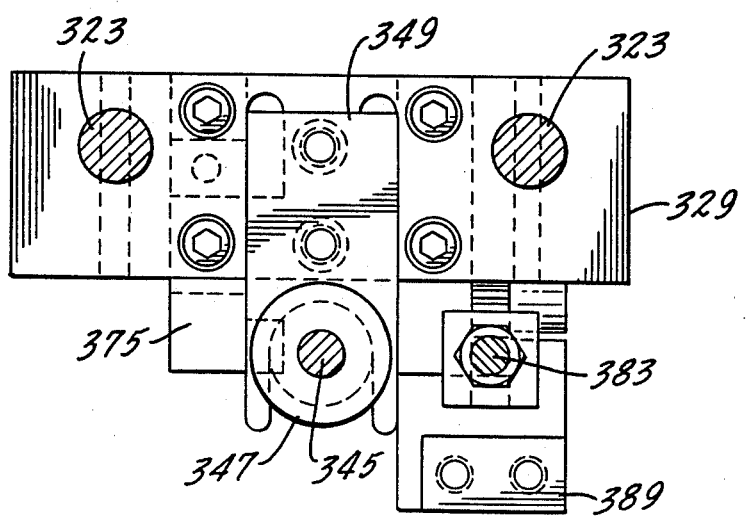

4,881,317

TERMINAL INSERTING APPARATUS

BACKGROUND AND SUMMARY OF THE INVENTION

This is a divisional of co-pending application Ser. No. 139,660 filed on Dec. 30, 1987, now U.S. Pat. No. 4,836,006.

This invention is concerned with a machine that continuously forms pointed terminals from a coil of wire that has not previously been deformed.

This invention is further concerned with a terminal forming machine in which the lengths of the terminals can readily be changed.

This invention is also concerned with a terminal forming machine which can readily be changed to handle wires of various sizes and cross-sectional shapes.

This invention is also concerned with a terminal forming machine that eliminates the need for shears or cutting dies by first deforming the wire with swedges and then twisting the wire at the deformed portion to separate a terminal from the wire.

This invention is also concerned with a terminal forming machine in which the supply of wire for the terminals is fed horizontally into the machine, and the terminals are inserted vertically into plastic parts.

This invention is also concerned with a terminal forming machine that drives the terminals into plastic parts that do not require preformed holes for the terminals.

This invention is also concerned with a terminal forming machine in which the force required to insert the terminals into the plastic parts can be varied.

This invention is also concerned with a terminal forming machine having a terminal inserter which picks up the terminal in a horizontal position and inserts it in a vertical position.

Other concerns of this invention may be found in the following specification, claims and drawings.

BRIEF DESCRIPTION OF THE DRAWINGS

The invention is illustrated more or less diagrammatically in the following drawings wherein:

FIG. 1 is a partial side elevational view of the terminal forming and inserting mechanism of this invention, with a moved position of the terminal inserting mechanism shown in phantom lines.

FIG. 2 is an enlarged partial view of the wire feeding mechanism of the terminal forming and inserting mechanism of this invention showing the wire feeding assembly in a forward feeding position.

FIG. 3 is a cross-sectional view taken along line 3—3 of FIG. 2.

FIG. 4 is a front elevational view of the mechanism of FIG. 2.

FIG. 5 is a rear elevational view of the mechanism of FIG. 2.

FIG. 6 is a partial side elevational view of the mechanism of FIG. 2 with the wire feeding assembly shown in a rear position, with some parts broken away and others shown in dashed lines for clarity of illustration.

FIG. 7 is a top plan view of the mechanism of FIG. 6.

FIG. 8 is a side elevational view of the terminal forming mechanism of this invention.

FIG. 9 is a front elevational view of the mechanism of FIG. 8.

FIG. 10 is a cross-sectional view on an enlarged scale, taken along line 10—10 of FIG. 9.

FIG. 11 is an exploded view of the mechanism of FIG. 8.

FIG. 12 is a diagrammatic view of a portion of a length of wire after deforming, but before separation.

FIG. 13 is a diagrammatic view of a portion of a length of wire after the terminal has been deformed from the main length of wire.

FIG. 19 is a front elevational view of the terminal insertion mechanism shown in its inserting position.

FIG. 20 is a side elevational view of the mechanism of FIG. 19.

FIG. 21 is a cross-sectional view, taken along line 21—21 of FIG. 19.

FIG. 22 is a rear elevational view of the mechanism of FIG. 19.

FIG. 23 is a cross-sectional view of the terminal inserting mechanism.

DESCRIPTION OF THE PREFERRED EMBODIMENT

Figure 14:
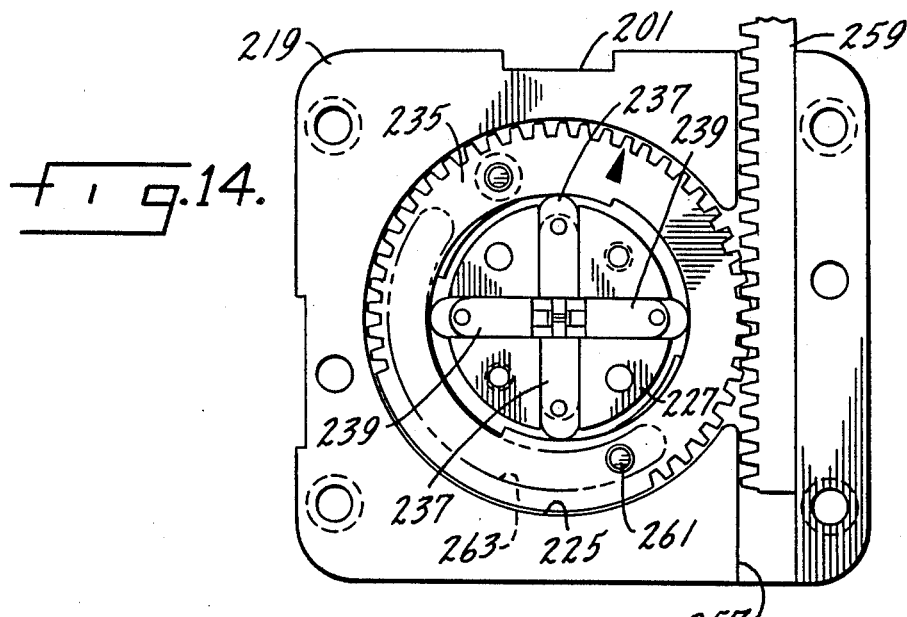
FIGS. 14–18 show the sequence of movement of the vertical and horizontal swedges during a wire deformation movement.
Figure 15:
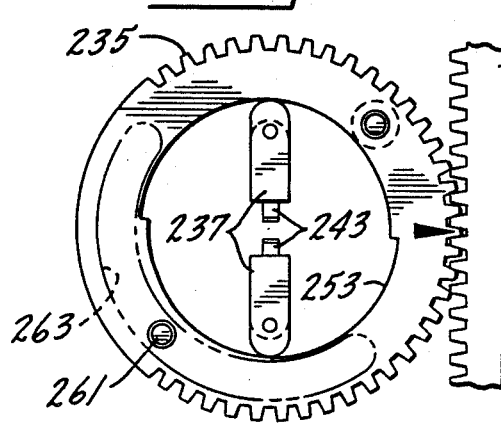
Figure 16:
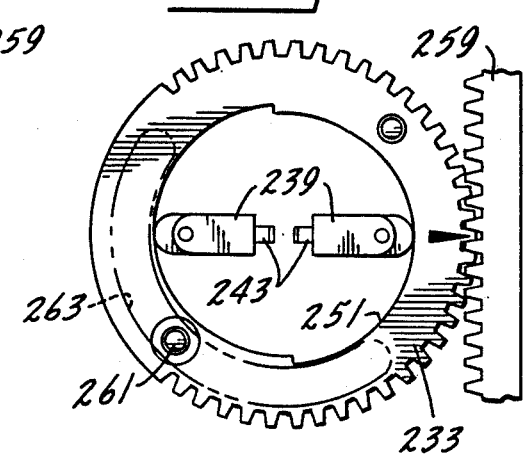
Figure 17:
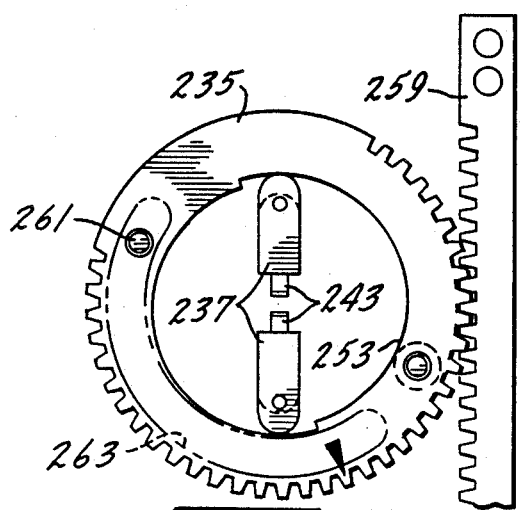
Figure 18:
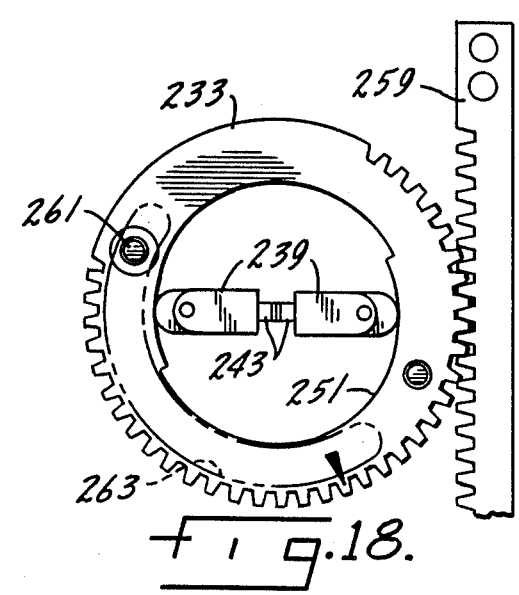

The terminal forming and inserting machine 31 shown in the drawings is used to form short pointed terminals T for insertions in pieces of plastic, which do not require preformed holes for the terminals, from a continuous length of wire W which is supplied from a reel of wire, not shown. The wire W is of non-circular cross section, preferably rectangular or square. Commercially available, standard wire of square cross section, in sizes from 0.015 to 0.060 inches, may be used as the wire W. The machine 31 includes a gooseneck frame 33 (FIG. 1) which is supported on a base 35, which in turn conventionally will rest on a table or other support, which is not shown. A support beam 37 of square cross section is attached to one side of and extends the length of the gooseneck frame 33. A wire feeding mechanism 39 hangs on the support beam 37. This mechanism feeds the wire W to a terminal forming mechanism 41 also supported on the gooseneck frame. From the terminal forming mechanism, terminals T are supplied to a terminal inserting mechanism 43 mounted on the end of the gooseneck frame 33. The terminal inserting mechanism inserts the terminals T in a plastic part 45, held in a fixture 47 supported on a stand 49.

A wire-clamping mechanism 51 engages the wire W to move it forward in steps with the wire clamp moving mechanism 53, which slides on spaced rails 55 (FIG. 2) supported by depending arms 57, which in turn hang down from the support beam 37. The distance of each forward movement of the mechanism 53 is equal to the length of a terminal T. The wire clamp moving mechanism 53 is operated by an air cylinder 59 mounted on a depending support 57 attached to the support beam 37. The air cylinder has a rod 61 (FIG. 7) with a clevis 63 fastened to the end thereof. The clevis 63 receives an integral finger 65 of a plate 67 connected to a mounting plate 69, which is a part of the wire clamp moving mechanism 53. A slide block 71 is also attached to the mounting plate 69, and it rides on the spaced rails 55 (FIG. 3) to carry the wire clamp moving mechanism 53.

The wire clamp mechanism 51 includes a wire clamp base 77, shown in detail in FIGS. 2, 4 and 6. A clamping lever finger 79 is pivotally mounted between two projecting portions of a clamping lever 81 (FIG. 4), also pivotally mounted on the mounting plate 69. An air cylinder 83, also mounted on the mounting plate 69, has a rod 85 which engages the clamping lever to move the lever finger 79 to thereby force the wire W against the wire clamp base 77. As shown in FIGS. 4 and 6, the wire clamp base 77 has a depending lip 87 in which is formed a groove 89 to receive and hold the wire W. The lip 87 does not extend downwardly as far on the right hand side of the groove 89, as viewed in FIG. 4, as it does on the left hand side. This is to permit the wire W to be positioned in the groove by inserting it from the side of the mechanism and to eliminate the need to thread the wire W through the groove 89. The clamping lever 79 has a notch 91 to receive the depending lip 87 of the wire clamp base, as shown in FIG. 2.

A nylon guide screw 95 having an opening therethrough of substantially the same cross section as the wire W (see FIG. 7) guides the wire to the groove 89 in the wire clamp base 77. The nylon guide screw 95 is mounted in a wire guide and stop holder 97, which is attached to one of the depending supports 57 (FIG. 5). A rear stop plate 99 is also mounted on the rear guide and stop holder 97 and engages the plate 67 (FIG. 6) to stop rearward movement of the wire clamp moving mechanism 53. The length of this part can be varied to adjust the rearward movement of the wire clamp moving mechanism 53, thereby varying the length of the terminals T formed by the mechanism. A front stop for the wire clamp mechanism 53 is provided by a bolt assembly 101 (FIG. 1) mounted on the front depending support 57. This assembly has an adjustable jam nut 103, shown in FIG. 7 of the drawings. A front stop 105 attached to the mounting plate 69 engages the bolt assembly 101 to limit forward movement of the wire clamp moving mechanism 53.

The terminal forming mechanism 41 of this invention is shown in relation to the other parts of the terminal forming and inserting machine 31 in FIG. 1 and in detail in FIGS. 8–18 of the drawings. As shown in FIG. 1, it is supported on the gooseneck frame 33 and aligned with the groove 89 of the wire clamp base 77 by means of the support beam 37, which fits in a notch 201 formed in the top of the housing 203 of the terminal forming mechanism in the manner shown in FIG. 9. The housing 203 includes a back plate 205 having a passage 207 with a tapered entrance 209 for the wire W. The passage 207 aligns with the groove 89 in the wire clamp, base-depending lip 87. A rear wire guide 211 is positioned inside the terminal forming housing 203 and has an integral square base 213 and a circular nozzle portion 215. A passage of non-circular cross section conforming to that of the wire W is formed in the square base and circular nozzle by means of an electrical discharge machining process (hereinafter referred to as an EDM process) using a sparking wire which cuts a thin slot through the part to form the passage. The entrance and exit to the passage are tapered for easier passage of the wire W. The rear wire guide 211 is mounted in a gear and swedge block 219, with the square base 213 of the guide seated in a cavity 221 formed in the gear and swedge block. The nozzle 215 of the rear wire guide extends through an opening 223 formed in the gear and swedge block and extends into a circular cavity 225, also formed in this block. A hub 227, shown most clearly in FIGS. 11 and 14 of the drawings, is formed as part of the gear and swedge block 219 and also extends into the circular cavity 225. Intersecting vertical and horizontal passages 229 and 231 are cut through this hub. Cam gears 233 and 235, each having external teeth and internal cam surfaces, are positioned in the circular cavity 225 and rotate about the hub 227.

Vertically-sliding swedges 237 move in the vertical passage 229 and horizontally-sliding swedges 239 move in the horizontal passage 231. Each swedge has a cam follower portion 241 which rides on the cam surface of its gear and a deforming projection or die 243 at the opposite end of the swedge for engagement with the wire W. A pin 245 extends out of each swedge near the cam follower portion and engages a spring 247 captured in a slot 249 formed in the block 219 to bias the swedge toward the cam surface of its gear. Cam gear 233 has cam surface 251, while cam gear 235 has cam surface 253. Plastic spring retaining plates 255 contact the springs and ends of the swedge pins and are held in place by the back plate 205 of the housing 203.

A rack passage 257, shown most clearly in FIGS. 11 and 14, is formed in the terminal forming mechanism housing 203 and intersects the circular cavity 225 so that the teeth of the rack 259, which reciprocates in the rack passage, engage the teeth of both cam gears 233 and 235.

A drive pin 261 extends through both of the cam gears 233 and 235 and projects forward thereof through an arcuate slot 263 formed in plate 265, most clearly shown in FIGS. 9, 11 and 14–18 of the drawings. A square central opening 267 is formed in the center of the plate 265, and a front wire guide 269 is seated in the square opening 267 by means of a square base 271. A passage 273 of the same cross section as the wire W is formed in the front wire guide 269 by means of an EDM process, again using a sparking wire which cuts a thin slot through the part and into the passage.

A wire twister 275 has a hub 277 which fits over the front wire guide 269 and a flange 279 that seats in a recess 281 formed in plate 265. An opening 283 shown in FIG. 9 is formed in the wire twister to receive the drive pin 261 so that the pin can rotate the twister as the pin rotates with the gears 233 and 235.

A passage 285 of the same non-circular cross section as the wire W is formed in the hub portion 277 of the twister 275. This passage is formed in a conventional manner by an EDM process using a thin slot 287 formed in the hub and extending from a drilled hole 289, also formed in the hub. A front plate 291 having a central opening 293 which receives the hub 277 of the twister 275 is fastened to the plate 265 and block 219 to hold the housing 203 together. The rack 259 is reciprocated by a three-position cylinder 299, shown most clearly in FIG. 1 of the drawings.

The terminal inserting mechanism 43 is shown in relation to the terminal forming and inserting mechanism 31 in FIG. 1 of the drawings, and is shown in detail in FIGS. 19–23 of the drawings. It is attached to the forward end of the gooseneck frame 33 at a ball bushing block 321. A pair of spaced slide shafts 323 are slidably mounted in ball bushings 325 (FIGS. 19 and 20) positioned in the ball bushing block 321. An upper cross member 327 is clamped on the slide shafts 323 near the upper ends thereof, while a lower cross member 329 connects the slide shafts at the lower ends thereof. An upper stop plate 331 is mounted on the top of the ball bushing block 321 and a pair of bottom plates 335 are attached to the bottom of the block 321 to retain the ball bushings 325 in the block.

A cylinder support 341 is mounted on the ball bushing block 321 and supports an air cylinder 343, as is shown most clearly in FIGS. 19 and 20. A piston rod 345 extends downwardly from the air cylinder 343 and has a piston rod clevis 347 attached to the end thereof, as shown in FIGS. 19 and 21. A clevis 349 attached to the lower cross member 329 connects with the piston rod clevis 347 to connect the piston rod 345 to the lower cross member 329.

A shock absorber and stop mechanism 353, to limit downward movement of the upper and lower cross members 327 and 329 and slide rods 323, is mounted on the upper cross member 327, and is shown in detail in FIG. 22 of the drawings. This shock absorber mechanism consists of adjustable spring shock absorbers 355 and an adjustable stop lug 357. The adjustable spring shock absorbers 355 engage the heads of bolts 359 mounted in the upper stop plate 331 of the ball bushing block 321, and the adjustable stop lug 357 engages the upper stop plate 331 to limit downwardly movement of the upper and lower cross members 327 and 329 and slide rods 323. A reed switch 361 is mounted on the air cylinder 343 to sense the return of the cylinder piston to its uppermost position. A magnet (not shown) is provided on the piston to actuate the reed switch.

A terminal pickup and holder assembly 371 is pivotally mounted on a shaft 373 supported at its opposite ends in shaft support blocks 375, which are mounted on the lower cross member 329, as shown in FIG. 19. A gear 379, shown in FIG. 20, is fastened to the shaft 373, and this gear is rotated by engagement with the teeth of a rack 381 connected to a piston rod 383 of an air cylinder 385. The cylinder 385 is supported on a cantileverly-mounted block 387, which in turn is supported on the top of an upright 389 attached to one of the shaft support blocks 375. Upper and lower stops 391 and 393 are provided to limit rotation of the terminal pickup and holder assembly 371, as driven by the rack 381 and gear 379.

The terminal pickup and holding member 371 is shown in cross-sectional detail in FIG. 23 of the drawings. It includes a tubular body 399 having a stepped-down nose portion 401 at the free end thereof. The tubular body is formed of two longitudinal half sections 403, see FIG. 19, which are held together at their upper ends by a retaining block 405 and at their lower ends by an O-ring 407. The retaining block 405 holds the tubular body to a pivot support member 409. The pivot support member has a passage 411 which receives the shaft 373 driven by the gear 379. A passage 413 is formed in the nose portion 401 of the tubular member 399 to receive and hold a terminal T pushed out of the terminal forming mechanism 41. The passage is initially formed by an EDM process with the same cross-sectional shape and size as that of a terminal T. In order to more securely hold a terminal T in the passage 413, the passage is slightly reduced in cross-sectional area by cutting the tubular member 399 longitudinally through the passage 413 to form the two longitudinal half sections 403. The provision of the O-ring 407 to hold the lower ends of the half sections together provides the small amount of expansion of the passage 413 necessary to accept the terminal T, while maintaining sufficient force on the terminal to hold it even when the terminal is in a vertical position.

Formed in the tubular body 399 immediately inwardly of the passage 413 are tubular chambers 415 and 417 with each having a larger diameter than the preceding passage or chamber. Located in these chambers is an inertia rod 419. The inertia rod has a cylindrical projection 421 which fits into the chamber 415 and a cap 423 at the opposite end which is seated in the retaining block 405. The inertia rod acts as a stop to limit inwardly movement of a terminal T into the passage 413, and also functions to prevent the terminal T from moving backwards in the passage 413 when it is driven into a plastic part 45. A sleeve 424 encircles a portion of the tubular body 399 and is held in place by an O-ring 425.

The use, operation and function of this invention are as follows.

This invention is concerned with a terminal forming and inserting machine that forms wire terminals T from a continuous reel of wire W that is not required to be deformed, scored or cut prior to installation in the machine. In other words, the machine uses a commercially available wire of square or rectangular cross section that does not require any pre-treatment before it is used to form terminals. The terminals are created from the wire W by deforming the wire at one location but not severing it, and moving the severed or deformed portion to a second location where it is twisted to be separated into a terminal. The machine picks up the terminal T at a third location and inserts it in a plastic part. Because the wire W does not have to be predeformed, scored or cut at the locations of the terminals, it is relatively simple to change the length of the terminals by adjusting the lengths of several of the parts in the machine which determine the length of the terminal. It is also relatively simple to convert the machine to form terminals of larger or smaller cross-sectional areas simply by changing designated parts in the machine. When the cross-sectional area of the terminal is changed, it is also possible with this mechanism to change the amount of force utilized to seat the terminal in the plastic part, and preformed holes are not required in the plastic parts for receiving the terminals. Thus, the holding power of the terminal in the plastic part is greatly increased.

The terminal forming and inserting machine 31 of this invention shown in the drawings is operated by a single operator and is actuated through the use of palm buttons, two in this case, for safety, which are not shown for clarity of illustration. Also, omitted from the drawings and the specification of this invention are the conventional air and electric supply, as well as timers and solenoid valves, which are required to control the operation of the terminal former and inserting machine. These parts which are necessary to the operation of the machine are omitted from this description of the invention since they are conventional and their use, installation and function are well-known to those skilled in this art. The plastic part 45 shown in fixture 47 is depicted diagrammatically only, and it should be understood and appreciated that this part may be of various shapes, and usually a number of terminals T are inserted in each part 45. This part is moved into its various positions relative to the terminal holder 371 by movement of the fixture 47, which again is a conventional device, and the use of such devices is well-known to those skilled in the terminal inserting art.

The operation of the terminal forming and wire-inserting mechanism 31 of this invention will be described through an ordinary cycle of its operation. The wire W extends in a horizontal direction from its reel, which although not shown is located to the rear and below the machine, through the nylon guide 95 which is in the shape of a screw, and between the wire clamp base 77 and the clamping lever finger 79, with the wire W being held in the groove 89 in the wire clamp base.

The wire W extends forward from the groove 89 through passage 207 in the back plate 205 of the terminal forming mechanism 41 and then outwardly of the wire twister 275 in the form of a terminal T where the terminal T is picked up by the terminal-holding and inserting mechanism 371.

In a normal sequence of operation there is an intermittent or stepped forward movement of the wire W, in other words to the left as viewed in FIG. 1. The wire is moved by the wire clamp moving mechanism 53. The sequence of operation is as follows.

First, the air cylinder 83 is actuated, extending its piston rod 85 and clamping the wire W between the wire clamp base 77 and clamping lever finger 79, with the wire being located in the groove 89 in the wire clamp base 77. Upon clamping of the wire W the air cylinder 59 is actuated to extend its piston rod 61, the wire clamp moving mechanism 53 and the wire W toward terminal forming mechanism 41 and into passage 207 in back plate 205 of this terminal forming mechanism. The movement of the wire clamp mechanism 53 continues until plate 105 engages stop bolt assembly 101, shown in FIG. 7, which is mounted on the forward depending arm 57. The movement of the air cylinder 83 is reversed to unclamp the wire W from the clamping mechanism. The cylinder 59 is reversed to move its piston rod and wire clamp moving mechanism 53 to the right, as viewed in FIG. 1, until plate 67 on the wire clamp moving mechanism 53 engages stop plate 99 mounted on the rear depending arm 57. This action has moved the wire W one terminal length T to the left, as viewed in FIG. 1.

Referring now to FIG. 10 of the drawings, the movement forward or leftward of the wire W, as viewed in FIGS. 1 and 10, brought about by movement of the piston rod 61 of cylinder 59, moves a portion of the wire W to the circular cavity 225 formed in the gear and swedge block 219. This portion of the wire W has had vertical deformations made in it by dies 243 of the vertical swedges 237, and these vertical deformations are positioned directly in line with the dies 243 of the vertical and horizontal swedges 237 and 239, respectively, as shown in FIG. 10 of the drawings. During the forward movement of the wire W the three-way cylinder 299, shown in FIG. 1 of the drawings, and its rack 259 are in their center positions, shown in FIGS. 15 and 16 of the drawings, in which both the vertical swedges 237 and the horizontal swedges 239 are in their retracted positions due to the shapes of the cam surfaces 251 and 253, respectively, of their gears 233 and 235. When the movement of the wire W is stopped, the piston rod of cylinder 299 and its rack 259 are then fully extended to the position shown in FIGS. 17 and 18 where the horizontal swedges 259 and their dies 215 make horizontal deformations on the wire W. This completes deformation of the wire, shaping the wire into the configuration shown in FIG. 12 of the drawings in which the wire is deformed but not severed. As the rack 259 moves to its lower position the wire twister 275 is rotated by the pin 261 in a clockwise direction, as viewed in FIGS. 15-18 of the drawings, to sever a terminal T from the wire W, as shown in FIG. 13. This severing takes place at the outer end of the front wire guide 269 at a location where the wire had previously been deformed, as shown in FIG. 12. The piston rod of piston 299 is then retracted along with its rack 259 through the center position, shown in FIGS. 15 and 16 of the drawings, in which both the vertical and horizontal swedges 237 and 239 are retracted from engagement, permitting another movement of the wire W by the piston rod cylinder 59. When the piston of piston rod 299 reaches its upper position, shown in FIG. 14 of the drawings, the vertical swedges 239 and their dies 215 are brought in contact with a new portion of the wire brought into position under the dies 243 and the vertical deformations are formed in the wire W. Movement of the rack 259 to its uppermost position, shown in FIG. 14, returns the wire twister 275 in a counterclockwise direction to the position shown in FIG. 14.

After a terminal T is severed from the wire W, it is held in the wire twister 275 with a major portion of the terminal T extending outwardly thereof to the left, as viewed in FIG. 10, until it is forced into the passage 413 in the terminal pickup and holder assembly 371, which is pivotally mounted on the terminal inserting mechanism 43. The passage 413 is of slightly smaller cross-sectional area than that of the terminal T. But because the house 399 is split in two longitudinally-extending sections, held together by the flexible O-ring 407, the terminal T is forced into the passage 413 and held there by the resilience of the O-ring.

Actuation of the air cylinder 385 retracts the rack 381 and through engagement with the gear 379 rotates the terminal holder and inserting mechanism 371 to the vertical position, shown in solid lines in FIGS. 1, 19 and 20 of the drawings. Actuation of the air cylinder 343 extends its piston rod 345 downwardly and moves the upper and lower cross members 327 and 329 and the terminal pickup and holder assembly 371 downwardly until the terminal T is inserted into the plastic part 45 mounted on the fixture 47. Downwardly movement of the terminal pickup and holder assembly 371 is limited by engagement of the adjustable stop lug 357 carried on the upper cross member 327, with the stop plate 331 mounted on the top of the ball bushing block 321.

When the terminal T is inserted in the plastic part 45, the air cylinder 343 is reversed and the terminal pickup and holder assembly is raised, leaving the terminal T embedded in the plastic part. Upper movement of the terminal pickup and holder assembly 371 is stopped when the reed switch 361 indicates the piston of cylinder 343 has returned to its uppermost position. The terminal pickup and holding member 371 is rotated 90 degrees to its terminal pickup position by actuation of the air cylinder 385, which extends its piston rod 383 out of the cylinder 385, as viewed in FIGS. 19 and 20 of the drawings.

Whereas the preferred form of the invention has been shown and described herein, it should be realized that there may be many modifications, substitutions and alterations thereto.

I claim:

1. An apparatus for picking up a terminal being supported horizontally, rotating the terminal to a vertical position, and inserting it in a plastic part, including:

a tubular body having a terminal-receiving passage and an opening into the passage at a free end thereof, said passage having a cross section that is slightly smaller than that of the terminal to be received therein, said tubular body consisting of two longitudinal half sections held together near the free end thereof by an elastic member, a larger diameter passage formed in a tubular body and connecting with the terminal-receiving passage, an inertia rod positioned in the larger diameter passage in engagement with an end of the terminal located in the terminal passage, means pivotally mounting said tubular body for rotation between a horizontal position and a vertical position in which the free end thereof extends downwardly, means to rotate said tubular body between a horizontal position and vertical position, and means to move said tubular body downwardly to insert the terminal in a plastic part and to return said tubular body to an upright position where it can be rotated to its horizontal position.

* * * * *